(No Model.) 2 Sheets—Sheet 1.
R. GALLOWAY.
GRAIN DRILL.
No. 530,585. Patented Dec. 11, 1894.
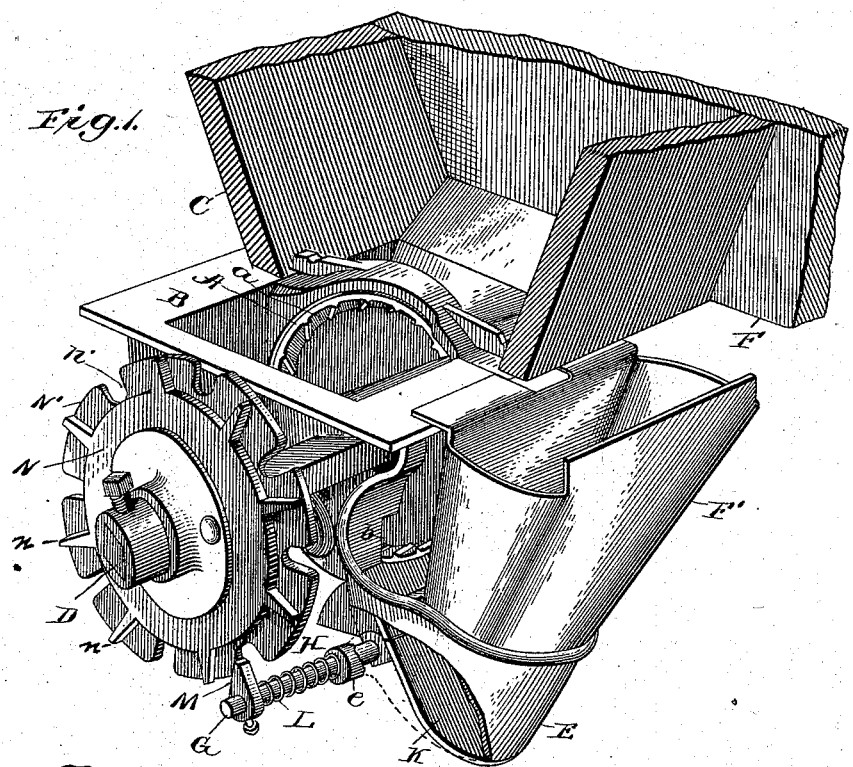
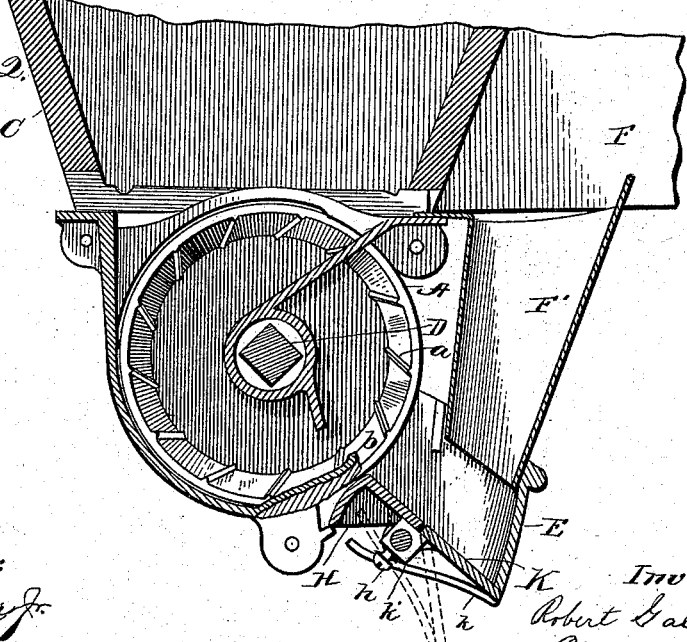
Witnesses:
J. M. Fowler Jr.
Thomas Durant
Inventor:
Robert Galloway,
By Church & Church
his Attorneys.

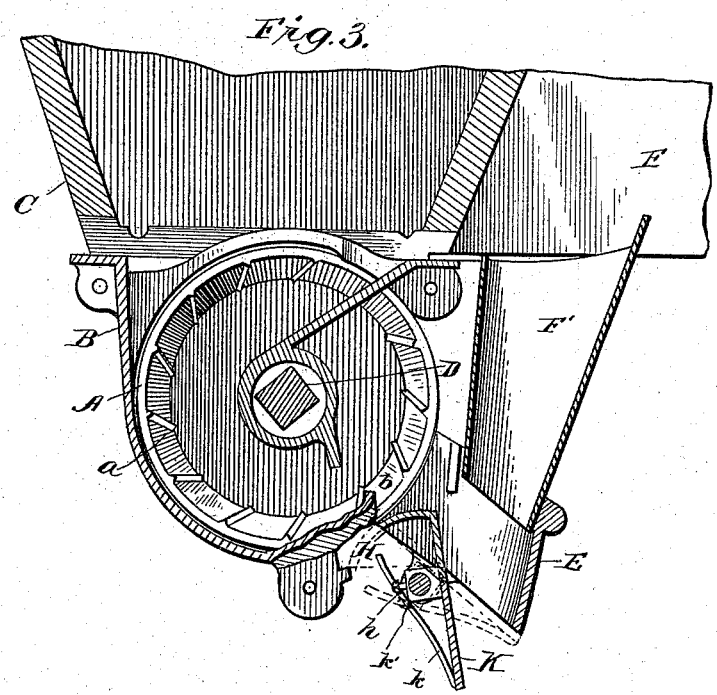

UNITED STATES PATENT OFFICE.

ROBERT GALLOWAY, OF MACEDON, NEW YORK.

GRAIN-DRILL.

SPECIFICATION forming part of Letters Patent No. 530,585, dated December 11, 1894.

Application filed August 27, 1894. Serial No. 521,433. (No model.)

*To all whom it may concern:*

Be it known that I, ROBERT GALLOWAY, of Macedon, in the county of Wayne, in the State of New York, have invented certain new and useful Improvements in Grain-Drills; and I do hereby declare the following to be a full, clear, and exact description of the same, reference being had to the accompanying drawings, forming a part of this specification, and to the letters of reference marked thereon.

This invention relates to improvements in seeding machines and it has for its object to adapt the ordinary continuous feed or drilling machines which sow in continuous rows, for sowing in "hills," or at predetermined intervals whereby they may be employed for seeding corn, beans, &c., in interrupted rows or "hills." In machines of this class as ordinarily constructed the grain and fertilizer are contained in separate hoppers and are fed continuously by suitable mechanism into a secondary hopper or hoppers which open into a channel or channels from which the seed and fertilizer commingle and are dropped to the ground.

My invention may be said to consist primarily in providing a seed retainer in the seed passage below the continuous feed mechanism and above the fertilizer opening with an operating mechanism driven from the seed shaft for periodically discharging the seed.

Further this invention consists in combining with said seed retainer a periodically operated valve located at a lower point and adapted to periodically check and discharge the fertilizer and seed when a continuous feed of fertilizer is not desired, all of said parts being located immediately below the hoppers at some distance above the ground in order to prevent bunching the seed and crowding in stooling out.

This invention further consists in certain novel details of construction and combination and arrangements of parts all as will be now described and pointed out particularly in the appended claims.

Referring to the accompanying drawings Figure 1 is a perspective view showing a single seeding mechanism with portions of the hoppers, &c., removed or broken away. Fig. 2 is a vertical section through the lower portion of the same with the valve shown in dotted lines as though thrown out of operation. Fig. 3 is a similar view with the parts at the opposite extremes of their movement, *i.e.*, the valve thrown open and the retainer in position to check the flow of grain.

Like letters of reference in the several figures denote the same parts.

In the embodiment of this invention illustrated, an old and well known form of seed feeding mechanism is used consisting essentially of a vertically arranged disk A mounted in a suitable housing or cup B secured in the bottom of the seed hopper C, said housing having a discharge opening or openings $b$ one on each side of the disk, and the disk having a peripheral internally roughened or ribbed flange $a$. Passing through the housing and disk is a square drive shaft D deriving motion from any suitable source and adapted to give motion to the disk or the series of disks where a number are used as is usual in machines of this class.

Extending downward and forward from the casing is what is termed a secondary hopper E, into which the seed and fertilizer are discharged and from which they are led down to the ground through any suitable conduits shoe or equivalent which I have not deemed it necessary to show. The secondary hopper is small being extended at the top only so far as is necessary for the entrance of the mouth of the fertilizer distributer hopper indicated by the letters F and F', the mechanism employed to agitate and discharge the fertilizer being omitted as they form no part of the invention and would only tend to complicate the drawings.

Through the bottom portion or beneath the secondary hopper E and preferably through bearings $e$ on said hopper I pass a light shaft G. This shaft carries the retainer and valve, the former consisting of a segmental structure H secured on the shaft by a set screw $h$ or otherwise and working accurately in the secondary hopper to interpose its outer surface in the seed package to form a shelf or ledge upon which the seed will rest as shown in Fig. 3 or to be withdrawn and leave a clear passage for the seed as shown in Fig. 2. The valve lettered K is pivotally connected to the shaft so as to have a movement relative to the retainer as shown in the dotted lines Figs.

2 and 3 and it is held in its proper relative position by a spring lock $k$ working over a corner or shoulder $k'$ on the shaft or retainer and operating to hold the valves in proper position to completely close the bottom of the secondary hopper when the retainer is withdrawn from the seed passage and to open to discharge the accumulated seed and fertilizer as the retainer advances or to hold said valve normally open and out of operative position all the while as indicated in dotted lines in said Figs. 2 and 3.

As a convenient means for moving the valve and retainer, the shaft is provided with a spring L which tends to hold the valve normally closed and the retainer withdrawn from the seed passage, and a cam arm M adapted to co-operate with an operating disk such as N or N' on the main or drive shaft D.

The operating disk N is shown provided with a series of teeth or projections $n$, thereon adapted to strike the cam arm in succession to operate the retainer and valve; the number of teeth on the disk, of course determining the number of operations of the retainer and valve during each rotation of the drive shaft, and the disk N' is provided with a series of notches or depressions $n'$ formed by widening the teeth, for giving a reverse operation, or, in other words for operating the retainer when the valve is out of operation to secure an intermittent feed of seed with a continuous feed of fertilizer and it will be understood that one operating disk will operate a series of feeds, when so desired.

From the foregoing the operation will be clear.

When the machine is in motion the drive shaft seed feeding disk and fertilizer feeding mechanism are in constant operation as ordinarily, and if it is desired to give an intermittant feed of both seed and fertilizer the disk N is brought into position for co-operating with the cam arm. When one of the projections on the said operating disk moves the arm, the valve will be opened discharging the accumulated seed and fertilizer and simultaneously the retainer moves into the path of the seed checking the flow momentarily while the valve is open, thus preventing overlengthening of the "hills." As the valve closes the retainer is retracted and the seed held by it allowed to drop down upon the valve. These operations are repeated while the machine is in operation.

Should it be desired to have a continuous feed of fertilizer, the valve is thrown back as shown in dotted lines, when the retainer will cause an intermittent feed, or if it is desired to have longer intervals the operating disk N' is brought into position for engaging the cam arm, the result of this being that the retainer is normally held advanced so as to check the flow of seed, but when the arm drops into one of the notches $n'$, the retainer is momentarily withdrawn and the accumulated seed allowed to drop.

By locating the intermittingly operating or feeding mechanism some distance above the ground or immediately below the seed feeding mechanism the grain is caused to spread itself thereby preventing crowding in stooling out.

Having thus described my invention, what I claim as new is—

1. In a seed drill, the combination with the main shaft the rotary seed feeding disk thereon and the secondary hopper below the disk of the segmental reciprocatory retainer located in the hopper, the shaft and cam arm connected therewith and the disk on the main shaft cooperating with the cam arm to operate the retainer; substantially as described.

2. In a seed drill the combination with the continuous seed feeding or drilling mechanism and secondary hopper into which the seed and fertilizer discharge, an intermittingly operated retainer located in the said secondary hopper above the fertilizer discharge the shaft and cam arm connected therewith and the independent operating disk mounted on the main shaft, cooperating with the cam arm to operate the retainer.

3. In a seed drill, the combination with the main shaft, seed drilling mechanism operated thereby and the fertilizer conduit, of a secondary hopper into which the seed and fertilizer are discharged, a valve at the bottom of said secondary hopper, a retainer for checking the flow of seed to the hopper and an operating mechanism for simultaneously moving the retainer into operative position as the valve is opened and vice versa; substantially as described.

4. In a seed drilling machine, the combination with the seed drilling mechanism fertilizer conduit and secondary hopper into which the seed and fertilizer are discharged, of the intermittingly operated retainer located in the seed channel, a valve for closing the hopper moving with the retainer and a pivoted connection and lock between the valve and retainer for holding the valve in or out of operative position as desired; substantially as described.

5. In a seed drilling machine, the combination with the seed drilling mechanism fertilizer conduit and secondary hopper into which the seed and fertilizer are discharged, of the retainer located in the seed channel, a valve pivotally connected with the retainer for closing the hopper, a shaft connected with said valve and retainer, a cam arm carried by the shaft and an operating disk with which said arm cooperates for intermittingly moving the retainer and valve, driven by the seed drilling mechanism; substantially as described.

6. In a seed drilling machine the combination with the seed drilling mechanism, fertilizer conduit and secondary hopper into which the seed and fertilizer are discharged, of the retainer located in the seed channel, a valve pivotally connected with the retainer for closing the hopper, a spring lock for holding the valve in or out of operative position, a shaft connected with said valve and retainer, a cam arm carried by the shaft and an operating disk driven by the seed drilling mechanism and cooperating with the cam arm for moving the retainer and valve intermittingly; substantially as described.

7. In a seed drill, the combination with the continuous seed drilling mechanism and secondary hopper into which the seed and fertilizer discharge an intermittingly operated valve at the bottom of said hopper, the shaft and cam arm connected therewith and the independent operating disk on the main shaft cooperating with the cam arm to operate the valve; substantially as described.

ROBERT GALLOWAY.

Witnesses:
 ADDISON W. GATES,
 CARL F. GATES.